United States Patent
Tripathi et al.

(10) Patent No.: US 9,722,520 B2
(45) Date of Patent: *Aug. 1, 2017

(54) DIRECT POWER AND STATOR FLUX VECTOR CONTROL OF A GENERATOR FOR WIND ENERGY CONVERSION SYSTEM

(75) Inventors: Anshuman Tripathi, Singapore (SG); Cao Shu Yu, Singapore (SG); Allan Holm Jörgensen, Aalborg Ø (DK); Lars Helle, Suldrup (DK); Saurabh Gupta, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 13/060,374

(22) PCT Filed: Aug. 28, 2009
(Under 37 CFR 1.47)

(86) PCT No.: PCT/EP2009/061150
§ 371 (c)(1),
(2), (4) Date: Dec. 14, 2011

(87) PCT Pub. No.: WO2010/023284
PCT Pub. Date: Mar. 4, 2010

(65) Prior Publication Data
US 2013/0147442 A1    Jun. 13, 2013

Related U.S. Application Data

(60) Provisional application No. 61/093,864, filed on Sep. 3, 2008.

(30) Foreign Application Priority Data

Aug. 29, 2008  (EP) .................................... 08163325

(51) Int. Cl.
*H02P 9/00* (2006.01)
*H02P 9/48* (2006.01)
(Continued)

(52) U.S. Cl.
CPC .............. *H02P 9/48* (2013.01); *F03D 7/0272* (2013.01); *F03D 9/25* (2016.05); *H02P 9/30* (2013.01);
(Continued)

(58) Field of Classification Search
CPC .. F03D 7/0272; F03D 9/002; F03B 2270/101; F03B 2270/1016
(Continued)

(56) References Cited

U.S. PATENT DOCUMENTS 5,083,039 A    1/1992  Richardson et al.
5,652,485 A    7/1997  Spiegel et al.
(Continued)

FOREIGN PATENT DOCUMENTS

EP    0581396 A1    2/1994
GB    2411252 A     8/2005
JP    2002-27633 A  9/2002

OTHER PUBLICATIONS

Machine translation of JP 2002-276533.*
(Continued)

*Primary Examiner* — Tulsidas C Patel
*Assistant Examiner* — Thomas Quigley
(74) *Attorney, Agent, or Firm* — Patterson + Sheridan, LLP

(57)  ABSTRACT

A method for controlling a variable speed wind turbine generator is disclosed. The generator is connected to a power converter comprising switches. The generator comprises a stator and a set of terminals connected to the stator and to the switches of the power converter. The method comprises:
(Continued)

determining a stator flux reference value corresponding to a generator power of a desired magnitude, determining an estimated stator flux value corresponding to an actual generator power, determining a difference between the determined stator flux reference value and the estimated stator flux value, and operating said switches in correspondence to the determined stator flux reference value and the estimated stator flux value to adapt at least one stator electrical quantity to obtain said desired generator power magnitude.

10 Claims, 12 Drawing Sheets

(51) Int. Cl.
| | | |
|---|---|---|
| *F03D 7/02* | (2006.01) | |
| *H02P 9/30* | (2006.01) | |
| *H02P 21/12* | (2016.01) | |
| *H02P 21/22* | (2016.01) | |
| *F03D 9/25* | (2016.01) | |
| *H02P 101/15* | (2016.01) | |

(52) U.S. Cl.
CPC .............. *H02P 9/305* (2013.01); *H02P 21/12* (2013.01); *H02P 21/22* (2016.02); *F05B 2270/101* (2013.01); *F05B 2270/1016* (2013.01); *H02P 2101/15* (2015.01); *Y02E 10/723* (2013.01); *Y02E 10/725* (2013.01)

(58) Field of Classification Search
USPC .......................... 290/44; 322/24, 28, 32, 37
See application file for complete search history.

(56) References Cited

U.S. PATENT DOCUMENTS

| | | | |
|---|---|---|---|
| 5,798,631 A | 8/1998 | Spee et al. | |
| 6,005,783 A * | 12/1999 | Xue et al. | 363/36 |
| 6,420,795 B1 | 7/2002 | Mikhail et al. | |
| 6,741,059 B2 * | 5/2004 | Gokhale et al. | 318/700 |
| 6,847,128 B2 | 1/2005 | Mikhail et al. | |
| 7,327,123 B2 | 2/2008 | Faberman et al. | |
| 7,511,385 B2 | 3/2009 | Jones et al. | |
| 7,692,321 B2 | 4/2010 | Jones et al. | |
| 7,755,209 B2 | 7/2010 | Jones et al. | |
| 7,830,127 B2 | 11/2010 | Corcelles Pereira et al. | |
| 8,013,461 B2 | 9/2011 | Delmerico et al. | |
| 8,030,791 B2 | 10/2011 | Lang et al. | |
| 8,089,171 B2 | 1/2012 | Li et al. | |
| 8,198,742 B2 | 6/2012 | Jorgensen et al. | |
| 2004/0007995 A1* | 1/2004 | Fu | 318/254 |
| 2007/0102936 A1* | 5/2007 | Sarlioglu et al. | 290/52 |
| 2007/0102939 A1* | 5/2007 | Stommel | 290/55 |
| 2007/0278797 A1* | 12/2007 | Flannery et al. | 290/44 |
| 2009/0146500 A1* | 6/2009 | Jones et al. | 307/82 |

OTHER PUBLICATIONS

Machine Translation of JP 2002276533, no date.*
Nicholas Ponomarenko; Notice of Allowance issued in U.S. Appl. No. 13/273,558; Nov. 20, 2012; 17 pages; U.S. Patent and Trademark Office.
European Patent Office, International Preliminary Report on Patentability issued in related International application No. PCT/EP2009/061150 dated Sep. 2, 2010.
European Patent Office, International Search Report issued in International application No. PCT/EP2009/061150 dated Oct. 1, 2009.
European Patent Office, European Search Report issued in related European application No. EP08163325 dated Jun. 3, 2009.

* cited by examiner

DIRECT POWER AND STATOR FLUX VECTOR CONTROL OF A GENERATOR FOR WIND ENERGY CONVERSION SYSTEM

TECHNICAL FIELD

The present invention generally relates to power converters, and more specifically to power converters that may be connected to wind turbine generators (WTG) which operate at variable speeds, thereby providing a voltage and current with variable amplitude and frequency.

BACKGROUND OF THE INVENTION

Wind has been used for a long time as a source of power and in recent years it has become very common to use the wind for producing electrical power. In order to do so, the power in the wind is captured by a set of blades (normally two or three) of a wind power plant. The wind captured by the blades causes a shaft connected to the blades to rotate. The shaft is connected to a rotor of a generator, which hence rotates at the same speed as the shaft, or at a multiple of the speed of the shaft in case the rotor is connected to the shaft via a gearbox. The generator then converts the mechanical power provided by the wind into electrical power for delivery to a grid.

In order to optimize the efficiency of a wind turbine generator, it is preferred to use a variable speed generator, wherein the speed of the blades and hence the speed of the shaft depend on the wind speed. This implies that an optimum operating point for the WTG at various wind speeds must be established. This is done by controlling the torque and active (real) power delivered by the generator.

The primary purpose of a WTG is to deliver active power. Active power is the component of total, or apparent, electric power that performs work and is measured in watts. The control system in a WTG will control the active power drawn from the WTG in order to track the optimum speed operating point for the WTG by using either torque control or power control.

When power control is used, a power command based on an estimated power in the wind is fed to the control system. This commanded value is compared to the actual WTG output power and the difference is controlled.

When torque control is used, a torque command based on a torque available from the shaft is fed to the control system. This commanded value is compared to the actual generator torque and the difference is controlled.

Reactive power, measured in volt-amperes, establishes and sustains the electric and magnetic fields of alternating current machines. The apparent power, measured in volt-amperes, is the vector sum of the real and reactive power. Control systems of modern WTG may control both active and reactive power to the grid.

A first type of control systems for WTGs relate to independent control of (normally) three 120° spatially displaced sinusoidal voltages from the three stator phases of the generator. The generation of the sine waves is based on the properties of the generator, i.e. an equivalent model for the generator when operating in its steady state is derived from the electrical and mechanical characteristics of the generator wherein the control system is designed based on the type of generator used (e.g. asynchronous or synchronous).

The generation of one of the sine waves in the three phase system is normally performed independently of the other sine waves, i.e. this type of control systems operate as three separate single phase system controls rather than one common control of a three phase system. This fact result in that any imbalance in the three phase system or any interaction between the phases will not be considered in this type of control. Moreover, it is evident that the generator model will only be valid during steady state operation of the generator. During transient operation of the generator (start, stop, load changes etc) the control will hence allow high peak voltage and current transients. This result in a decreased power conversion efficiency as well as a need to oversize the electrical components of the WTG system in order to cope with transient surge currents and voltages.

In order to overcome the drawbacks of the above control structure, an alternative control structure generally named Field Orientated Control (FOC) have been introduced. The main idea behind FOC is to control the stator currents of the generator by using a vector representation of the currents. More specifically, FOC is based on coordinate transformations which transform a three phase time and speed dependent system into a two coordinate time invariant system.

The advantage of performing a transformation from a three phase stationary coordinate system to a rotating coordinate system is that the control of the generator may be done by controlling DC quantities and the response to transients is improved over that achievable with independent control over the three phase.

The transformation for FOC is performed in two steps: 1) transformation from the three phase abc stationary coordinate system to a two phase so called $\alpha\beta$ stationary coordinate system (known as Clarke transformation), and 2) transformation from the $\alpha\beta$ stationary coordinate system to a dq rotating coordinate system (known as Park transformation). More specifically, the transformation from the natural abc reference frame to the synchronous dq reference frame is obtained by the equations $$[\alpha_u \ \beta_u \ 0_u] = [a_u \ b_u \ c_u] \frac{2}{3} \begin{bmatrix} 1 & 0 & \frac{1}{2} \\ -\frac{1}{2} & \frac{\sqrt{3}}{2} & \frac{1}{2} \\ -\frac{1}{2} & -\frac{\sqrt{3}}{2} & \frac{1}{2} \end{bmatrix}$$

and $$[d_u \ q_u \ 0_u] = [\alpha_u \ \beta_u \ 0_u] \begin{bmatrix} \cos\theta & -\sin\theta & 0 \\ \sin\theta & \cos\theta & 0 \\ 0 & 0 & 1 \end{bmatrix}$$

which gives $$[d_u \ q_u \ 0_u] = [a_u \ b_u \ c_u] \frac{2}{3} \begin{bmatrix} \cos\theta & -\sin\theta & \frac{1}{2} \\ \cos\left(\theta - \frac{2\pi}{3}\right) & -\sin\left(\theta - \frac{2\pi}{3}\right) & \frac{1}{2} \\ \cos\left(\theta + \frac{2\pi}{3}\right) & -\sin\left(\theta + \frac{2\pi}{3}\right) & \frac{1}{2} \end{bmatrix}$$

where $\theta = \omega t$ is the angle between the stationary a axis and the synchronous d axis.

Controlling a generator by means of FOC requires a d axis aligned flux component. As explained above, the d and q oriented components are transformations from the stationary three phase coordinate system which implies that the FOC, due to the direct coupling to the three phase electrical quantities, will handle both steady state and transient operation of system irrespective of the generator model.

An advantage of FOC is that the control of parameters in a rotating coordinates theoretically allows uncoupled control between the parameters. Therefore with the amplitude of the rotor flux controlled to at a fixed value and the linear relationship between torque and torque component iq-stator it is possible to achieve satisfactory uncoupled control of WTG output power control U.S. Pat. No. 5,083,039 discloses a variable speed wind turbine comprising a turbine rotor that drives a multiphase generator, a power converter with switches that control stator electrical quantities in each phase of the generator, a torque command device associated with turbine parameter sensors that generates a torque reference signal indicative of a desired torque, and a generator controller operating under field orientation control and responsive to the torque reference signal for defining a desired quadrature axis current and for controlling the switches to produce stator electrical quantities that correspond to the desired quadrature axis current.

Despite the advantages with FOC disclosed above, there are shortcomings of the conventional controllers that the industry has lived with. These include for example (a) a difficulty maintaining correct decoupling between the flux and torque producing components of the stator currents during steady state and dynamics, (b) controlling the currents using linear controllers at higher speeds and higher modulation index. Case (a) relates to the parameter sensitivity and the need for adaptation of the same. This may put the controller reliability into stress under extreme conditions of load. Case (b) on the other hand relates to under utilization of the DC-link. Further since both of the methods described above may be use for wind turbine output control and output control ultimately involves an interaction between fluxes or currents and fluxes an ability to directly control flux leads to more robust and simpler systems

SUMMARY OF THE INVENTION

In view of the above, an objective of the invention is to provide an alternative method to the independent control of the three phase as well as classical FOC for controlling the power output of a WTG.

In particular, an objective is to provide a method for direct flux control in a design that has a greater control range for expected DC link voltages and wherein stator switches are directly operated based on a desired stator flux in a stationary reference frame. The objective is further to provide a method for determining the optimum switching times for a space vector modulation scheme using a stator flux vector error signal.

According to a first aspect, the present invention is realized by a method for controlling a variable speed wind turbine generator connected to a power converter comprising switches, said generator comprising a stator and a set of terminals connected to said stator and to said switches, said method comprising:

determining a stator flux vector reference value corresponding to a generator power of a desired magnitude, determining an estimated stator flux vector value corresponding to an actual generator power, and operating said switches in correspondence to the determined stator flux reference value and the estimated stator flux value to adapt at least one stator electrical quantity to obtain said desired generator power magnitude.

An advantage of this embodiment is that the switches are directly operated based on the stator flux in a stationary reference frame. The need for an additional transformation into a synchronous reference frame (such as in FOC) is hence avoided reducing the computational requirements on the control unit. Moreover, since the switches are directly operated based on the stator flux there is no constraint to maintain correct decoupling between the flux and torque producing components of the stator currents.

According to one embodiment of the invention, a stator flux difference value between the determined stator flux reference value and the estimated stator flux value may be determined and the switches may be operated in correspondence to said determined stator flux difference value.

An advantage of this embodiment is that the switches are directly operated based on a stator flux difference value which makes it possible to quickly derive the correct switching times for the switches.

According to one embodiment of the invention, a stator flux difference vector with a magnitude and direction may be determined by means of the difference between the stator flux vector reference value and the estimated stator flux vector value, and said switches may be operated based on said stator flux difference vector.

An advantage of this embodiment is that the switches are directly operated based on the phase and amplitude of a stator flux difference vector which facilitates a rapid determination of the correct switching times for the switches.

According to one embodiment of the invention, the switches may be operated according to a pulse width modulation scheme in order to generate a synthesized voltage waveform at the stator terminals.

An advantage of this embodiment is that the synthesized waveform may be generated with a high degree of efficiency due to the low losses associated with PWM switching.

According to one embodiment of the invention, the switches may be operated according to a space vector modulation scheme for controlling a switching pattern of said switches.

An advantage of this embodiment is that the space vector modulation scheme makes it possible to generate the switching pattern with a minimum of processing power.

According to one embodiment of the invention, the switching pattern may be formed by applying one or more vectors during one or more switching times, and said switching times for the switching pattern may be determined from the magnitude and direction of the stator flux difference vector.

An advantage of this embodiment is that the switching pattern may be determined in simple way from the space vector modulation scheme taking the phase and amplitude information of the stator flux difference vector into account.

According to one embodiment of the invention, the switches may comprise a first and a second set of switches and first set of the switches may be operated to an on-state during a first time interval, $\tau_a$, and the second set of the switches to an on-state during a second time interval, $\tau_b$.

An advantage of this embodiment is that the space vector modulation scheme may be efficiently implemented with a low demand for computational power.

According to one embodiment of the invention the first and second time intervals may be determined according to $$\tau_a = \frac{|\Delta\Psi_s^*(k)|\sin\left(\frac{\pi}{3}-\gamma\right)}{\frac{\pi}{3}\sin\left(\frac{\pi}{3}\right)}$$

$$\tau_b = \frac{|\Delta\Psi_s^*(k)|\sin(\gamma)}{\frac{\pi}{3}\sin\left(\frac{\pi}{3}\right)}$$

An advantage of this embodiment is that the on and off times for the switches may be directly and rapidly determined from the stator flux difference vector.

According to a second aspect, the present invention is realized by an apparatus for controlling a variable speed wind turbine generator connected to a power converter comprising switches, said generator comprising a stator and a set of terminals connected to said stator and to said switches, said apparatus comprising:

a power controller adapted to determine a stator flux vector reference value corresponding to a generator power of a desired magnitude, flux vector estimator adapted to determine an estimated stator flux vector value corresponding to an actual generator power, and a switch control unit adapted to operate said switches in correspondence to the determined stator flux reference value and the estimated stator flux value to adapt at least one stator electrical quantity to obtain said desired generator power magnitude.

According to a third aspect, the invention is realized by a computer program, comprising computer program code for performing the steps of the method mentioned above when executed in a device with data processing capabilities.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
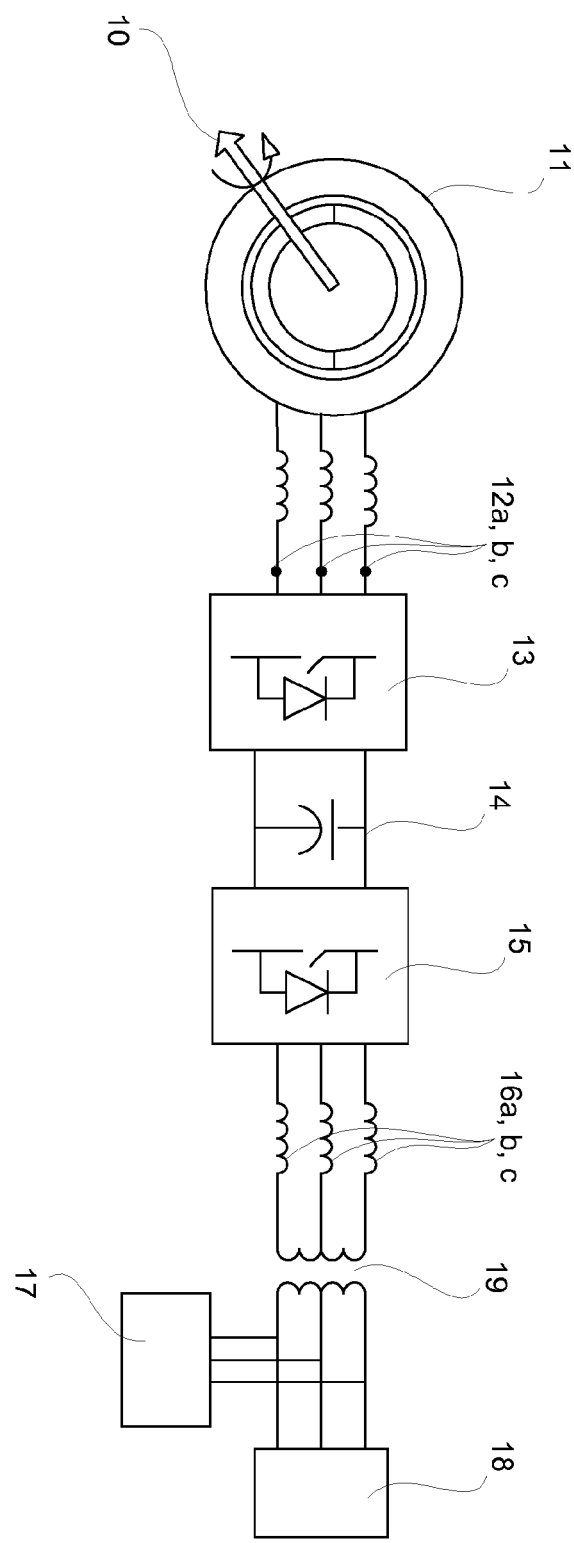
FIG. 1 illustrates generator converter system according to a preferred embodiment of the present invention.

FIG. 1 illustrates an example of a generator converter system according to a preferred embodiment of the present invention.

A shaft 10 transfers mechanical energy from an energy source, preferably a set of wind turbine blades (not shown), to a rotor of a variable speed generator 11. The shaft is preferably connected to the wind turbine blades, and to the rotor via a gearbox in order to adapt the rotational speed of the shaft 10 (i.e. speed of the wind turbine blades) to a speed range suitable for the generator 11. The generator 11 then converts the mechanical energy provided via the shaft 10 into electrical energy and delivers the electrical energy at a set of stator terminals 12a, 12b, 12c. For optimum performance in respect of converting the wind energy into electrical energy the shaft 10 will vary its speed as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c will vary according to the rotational speed of the shaft 10. The generator may be a singly- or doubly-fed synchronous generator, e.g. a permanent magnet (PM) generator, an induction generator or any other type of generator comprising a stator winding.

The terminals 12a, 12b, 12c of the generator 11 are connected to a generator side power converter 13. The converter 13 is preferably a three phase bridge converter 13 which includes six switches illustrated for the sake of clarity by the single switch and diode in FIG. 1. As will be disclosed in more detail below, the switches are arranged in a set of upper and lower switches which preferably are in the form of solid state devices, such as MOSFETs, GTOs or IGBTs. Other kind of switches, such as BJTs, however are equally possible depending on design considerations of the converter 13. The converter 13 will under normal operation function as an active rectifier converting the variable frequency AC voltage provided by the generator 11 into a DC voltage. The conversion is controlled using a pulse width modulation scheme, wherein control signals are applied to the switches in the converter 13 in order to provide the desired conversion functionality. In a preferred embodiment the switches are controlled by employing space vector modulation scheme, as will be disclosed below.

The output from the converter 13 is provided to a DC link 14, which comprises a link capacitor for reducing the voltage ripple on the DC link.

The DC link 14 is connected to a grid side power converter 15. The topology of the grid side power converter 15 is similar to the generator side power converter 13 disclosed above. The grid side power converter 15 normally operates as an inverter for converting the DC voltage on the DC link 14 into a regulated AC voltage for feeding active and reactive power to the grid 18. The switches of the grid side power converter 15 are provided with suitable control voltages in order to provide the desired voltage and power to a grid 18.

The output from the grid side power converter 15 is filtered by means of inductors 16a, 16b, 16c in order to e.g. remove higher order harmonics from the output power signal. The output power signal is then provided to the grid 18 via a transformer 19. The output power signal may, if needed, be filtered by a second filter 17 in order to keep the interference or harmonic distortion at a low value.

Figure 2:
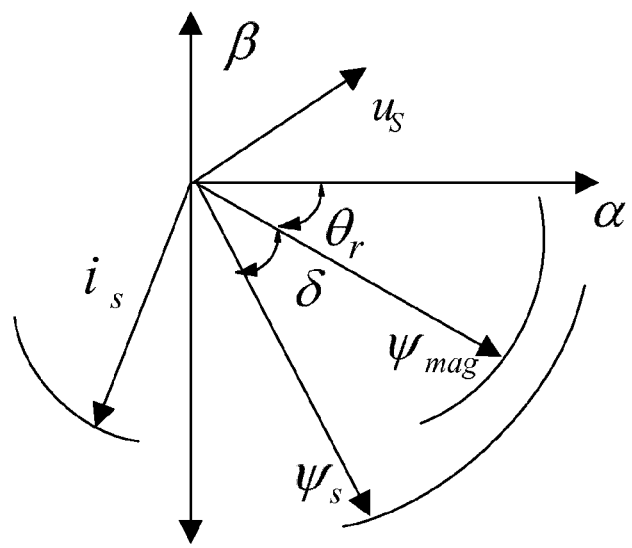
FIG. 2 illustrates a vector diagram for a synchronous generator represented in a stationary reference frame.

FIG. 2 illustrates a vector diagram for a synchronous generator represented in a stationary reference frame. The diagram comprises two stationary axes denoted α and β. The transformation from the stationary three phase abc reference frame to the αβ reference frame may be performed as disclosed above.

A first vector represents the magnetizing flux, denoted $\Psi_{mag}$ in the figure. In the example shown in FIG. 2, which refers to a synchronous generator, the magnetizing flux corresponds to the rotor flux. The rotor flux may be generated by means of a permanent magnet, as in a PM generator, or by excitation of a field coil in the rotor. The arc at the tip of the rotor flux vector illustrates that the vector rotates about the origin of coordinates in the figure. The angular displacement of the rotor flux vector from the α axis is denoted $\theta_r$ in the figure.

In a corresponding manner is the stator flux vector, denoted $\Psi_s$ in the figure, represented by a vector which rotates about the origin of coordinates. In steady state operation the stator flux vector rotates in the stationary reference frame with an angular speed equal to the rotor flux vector. The angular displacement of the stator flux vector from the rotor flux vector is denoted by δ in the figure.

The electromagnetic power of a synchronous generator can be expressed as:

$$P_{EM} = v_a i_a + v_b i_b + v_c i_c \propto \omega \psi_s \times \psi_r$$

which gives $$P_{EM} = f(|\psi_s|, |\psi_r|, \delta)$$

It is seen from the power equation above that for a given speed of operation, the electromagnetic power depends on the magnitude of the stator flux vector and it's location with respect to the rotor flux vector. If the position of the rotor flux vector is known, it is possible to apply a voltage that will position the stator flux vector to give the desired magnitude of the power at a given speed. Hence, by controlling the stator flux vector, the electromagnetic (EM) power, which corresponds to the load power, can be obtained as commanded.

Since the control is carried out in the stationary reference frame, it may be necessary to compensate for the phase delay created. This is achieved by a linear prediction carried out in polar co-ordinates.

Figure 3:
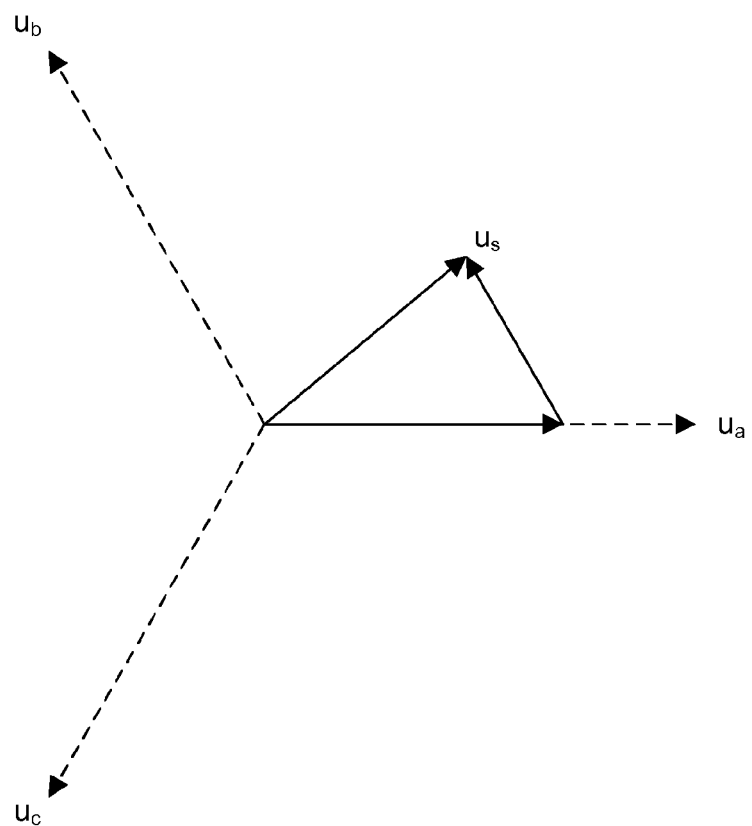
FIG. 3 illustrates a vector representation of the voltages present at the stator terminals of a generator.

FIG. 3 illustrates a vector representation of the voltages present at the stator terminals of a generator. In order to control the power created by the generator it is necessary to control the signals that are applied to the stator terminals. In this respect is space vector modulation (SVM) is an effective averaging algorithm for providing an AC output signal from a DC voltage. SVM also minimizes the harmonic contents which determines the copper losses in the generator. SVM is also effective in that it minimizes switching losses in the switches of the generator side power converter 13.

For a three phase generator, the voltages in the stationary abc reference frame may be represented as three 120° phase-shifted vectors (directions $u_a$, $u_b$ and $u_b$) in space, as shown in FIG. 3. For a balanced three phase system, these vectors sum to zero. This implies that the three vectors may be represented by a single space reference vector ($u_s$). The idea behind SVM is to control the amplitude and the frequency of Vs, which implies that voltage amplitude, phase and frequency at the stator terminals 12a, b, c and hence the flux in the stator can be controlled.

Figure 4A:
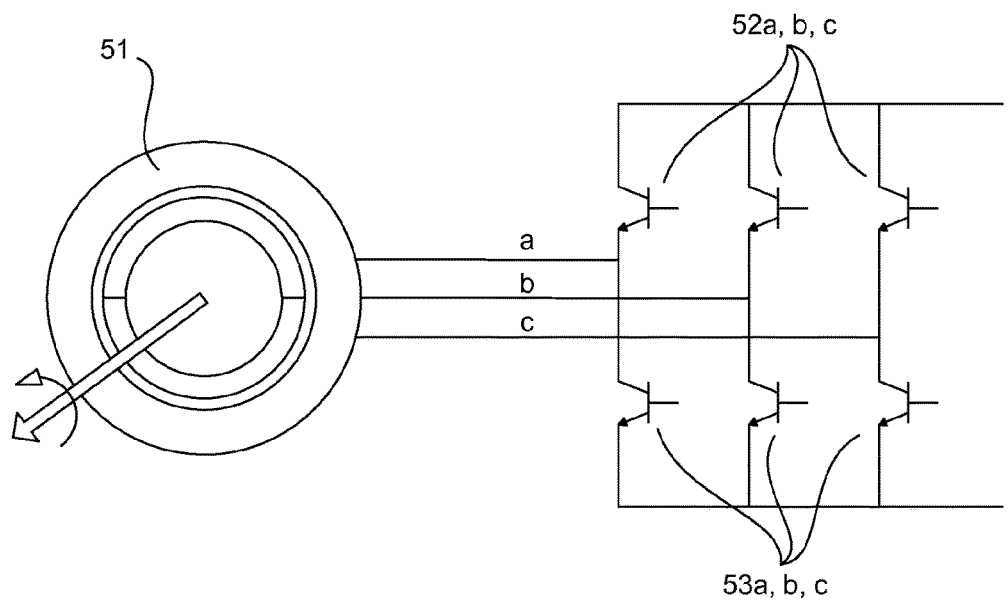
FIG. 4a is a more detailed illustration of the generator side converter illustrated in FIG. 1.

Referring to FIG. 4a, which is a more detailed illustration of the generator side converter 13 shown in FIG. 1. The switches 52ab b, c and 53a, b, c in the figure are illustrated as BJTs. It is, however, equally possible to use MOSFETs, GTOs, IGBTs etc as switching devices. Irrespective of the technology used for manufacturing the switches 52a, b, c, and 53 a, b, c, the switching sequence, or switching pattern, of the devices must follow certain rules. More specifically, whenever one of the upper switches 52a, b, c is conducting (i.e. in an on-state) the corresponding lower switch 53a, b, c should be off and vice versa. Moreover must three of the switches always be on and three switches always be off. These rules gives rise to eight distinct combinations for the switching states of the devices 52a, b, c and 53a, b, c. These combinations are denoted (abc) where e.g. a=1, b=0 and c=0 indicates that the upper switch 52a is on (thereby turning switch 53a off) while switches 52b and c are off. Six of the states are active states producing a voltage vector in a predefined direction while two of the states are inactive states, i.e. all upper switches 52a, b, c are off and all lower switches 53a, b, c are on, or vice versa.

Figure 4B:
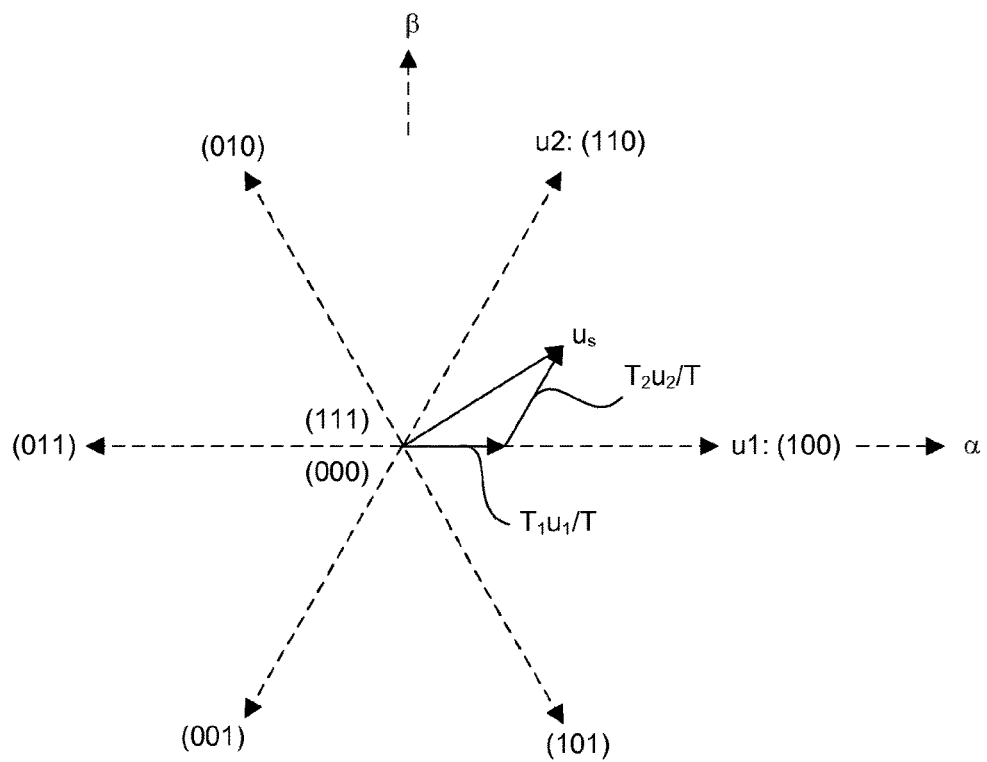
FIG. 4b illustrates eight switching states which determine a space vector hexagon.

The eight switching states defined above determine eight phase voltage configurations as illustrated in FIG. 4b. As seen in the figure, the vectors define a hexagon with six equally sized sectors spaced by 60°. Each sector is bounded by two active vectors. The inactive states are represented by the vectors (000) and (111) which are zero and are located at the hexagon origin. Two adjacent voltage vectors are chosen depending on the sector in which the vector $u_s$ is located (100 and 110 in FIG. 4b). From FIG. 4b it is clear that only one of the upper and lower switches are changing state when switching pattern moves from one sector to the adjacent sector, wherein the switching losses are kept at a minimum.

Normally, the switches are operated at a frequency F which is substantially higher than the grid frequency. The switching frequency F defines the sample period $\tau_s$ via the relationship $\tau_s = 1/F$. The sample period $\tau_s$ is used when generating the vector $V_s$ from the various voltage vectors (100, 110, etc). More specifically is the vector $u_s$ formed by time weighting the vectors during one sample period $\tau_s$. Mathematically may the vector $u_s$ be expressed as $$u_s = \frac{\tau_0}{\tau_s} u_0 + \frac{\tau_1}{\tau_s} u_1 + \ldots + \frac{\tau_7}{\tau_s} u_7$$

where $\tau_0, \tau_1 \ldots \tau_7$ is the time each vector $u_0, u_1 \ldots u_7$ is applied, respectively. The vectors $u_0$ and $u_7$ are the zero vectors (000, 111) which are applied in order to output a zero voltage.

When $u_s$ and $\tau_s$ are known it is possible to determine the on time for each vector, respectively, from the equations $$u_s = \frac{\tau_1}{\tau_s}u_1 + \frac{\tau_2}{\tau_s}u_2 + \frac{\tau_{07}}{\tau_s}u_{07}$$

and $\tau_s = \tau_1 + \tau_2 + \tau_{07}$

A problem resides in how to determine the desired vector $u_s$ in order to provide efficient control of the electrical power provided by the generator.

Figure 5A:
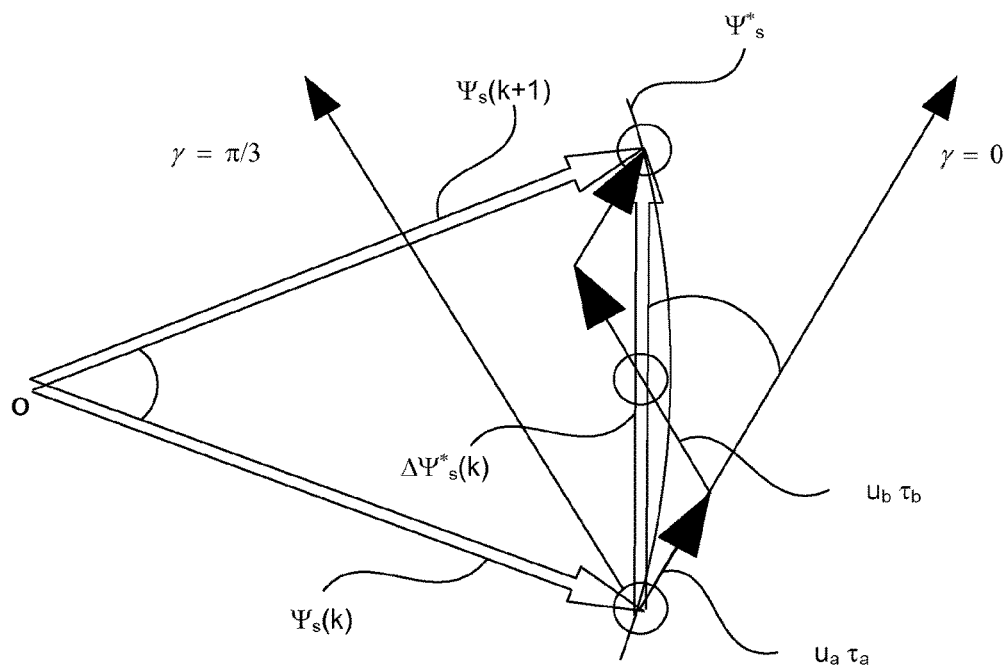
FIG. 5a illustrates one sector of the space vector hexagon illustrated in FIG. 4b.

FIG. 5a illustrates one sector of the space vector hexagon shown in FIG. 4b. The desired stator flux vector $\Psi_s$ at two subsequent time instances is illustrated as the vectors $\Psi_s(k)$ and $\Psi_s(k+1)$. The reference flux $\Psi_s^*$ is represented by a circular arc in the figure. The difference between the desired stator flux vector and the reference flux creates a flux error vector $\Delta\Psi_s^*(k)$ with a direction that is perpendicular to the direction of the desired flux. The flux in the stator relates to the generator EMF by the equation (Faraday's law)

$$e = \frac{\partial \Psi_s}{\partial t}$$

Figure 5B:
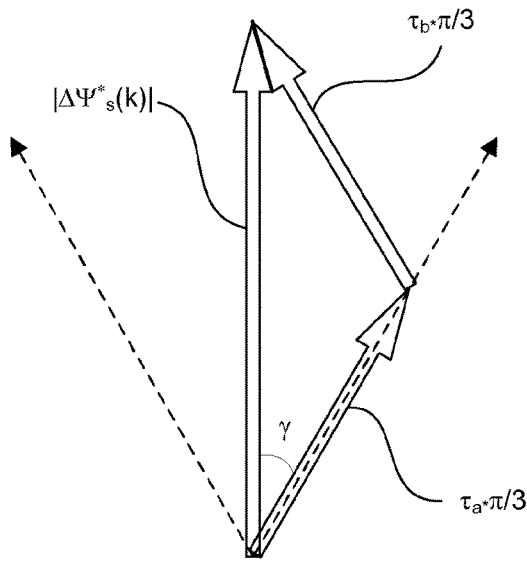
FIG. 5b illustrates a normalized voltage vector.

This implies that the flux error vector $\Delta\Psi_s^*(k)$ is proportional to a voltage vector that can be obtained as an average in a sample using adjacent vectors and is displaced by an angle $\gamma$ with respect to the voltage vector $u_a$ (i.e. the active vectors $u_0$, $u_1$ etc) in any sector of operation. Hence $\gamma$ varies from 0 to 60 degrees in a sector. The time each active vector, e.g. $u_1$ and $u_2$ in FIG. 5 is applied is denoted by $\tau_a$ and $\tau_b$ in the figure FIG. 5b illustrates an example where a normalized voltage vector is used to generate the switching times. The base for normalization is taken to be the peak value of the fundamental component of the phase voltage during six-step operation $$u_{peak} = \frac{2}{\pi}U_{DC}$$

where $U_{DC}$ is the DC-link voltage of a two level inverter disclosed above. In the space vector modulation scheme it can be shown that the length of each of the six vectors ($u_1$-$u_6$) is $$u_u = \frac{2}{3}U_{DC}$$

wherein the normalization of the voltage becomes $$\text{Normalization} = \frac{\pi}{3}$$

From the figure it can be seen that $$\frac{\frac{\pi}{3}\tau_a}{\sin\left(\frac{\pi}{3} - \gamma\right)} = \frac{\frac{\pi}{3}\tau_b}{\sin(\gamma)} = \frac{|\Delta\Psi_s^*(k)|}{\sin\left(\frac{\pi}{3}\right)}$$

from which the switching times for each of the active vectors may be derived, such that they define the control signals that are applied to the switches in the generator side power converter 13, according to $$\tau_a = \frac{|\Delta\Psi_s^*(k)|\sin\left(\frac{\pi}{3} - \gamma\right)}{\frac{\pi}{3}\sin\left(\frac{\pi}{3}\right)}$$

$$\tau_b = \frac{|\Delta\Psi_s^*(k)|\sin(\gamma)}{\frac{\pi}{3}\sin\left(\frac{\pi}{3}\right)}$$

$$\tau_0 = \tau_s - (\tau_a + \tau_b)$$

where $\tau_a$ is the time the first vector is applied (e.g. vector u1 in FIG. 4b) and $\tau_b$ is the time the second vector is applied (e.g. vector u2 in FIG. 4b).

Referring briefly to FIGS. 1, 4a and 7, the determined switching times are used as control signals by a switch control unit indicated by the PWM block 82. The PWM block 82 use the control signal for controlling the switches 52, 53 in the generator side power converter 13. By switching the states of the switches in the generator side power converter 13 it is possible to established stator electrical quantities such that a desired generator power level is achieved. More specifically, the control signals causes switches 52, 53 of the generator side power converter 13 to adjust the phase and voltage magnitude of its AC terminal voltage with respect to the EMF of the generator 11 in order to provide the desired electrical power.

Voltage generated by the generator side power converter 13 is defined by the requirement of the flux controller. So switching has to be carried out to mitigate the error in the stator flux vector $\Delta\Psi_s^*(k)$. This approach of flux vector control can be extended to any modulation index. During the normal space vector modulation range, the error can be compensated through switching in one sample.

Figure 6:
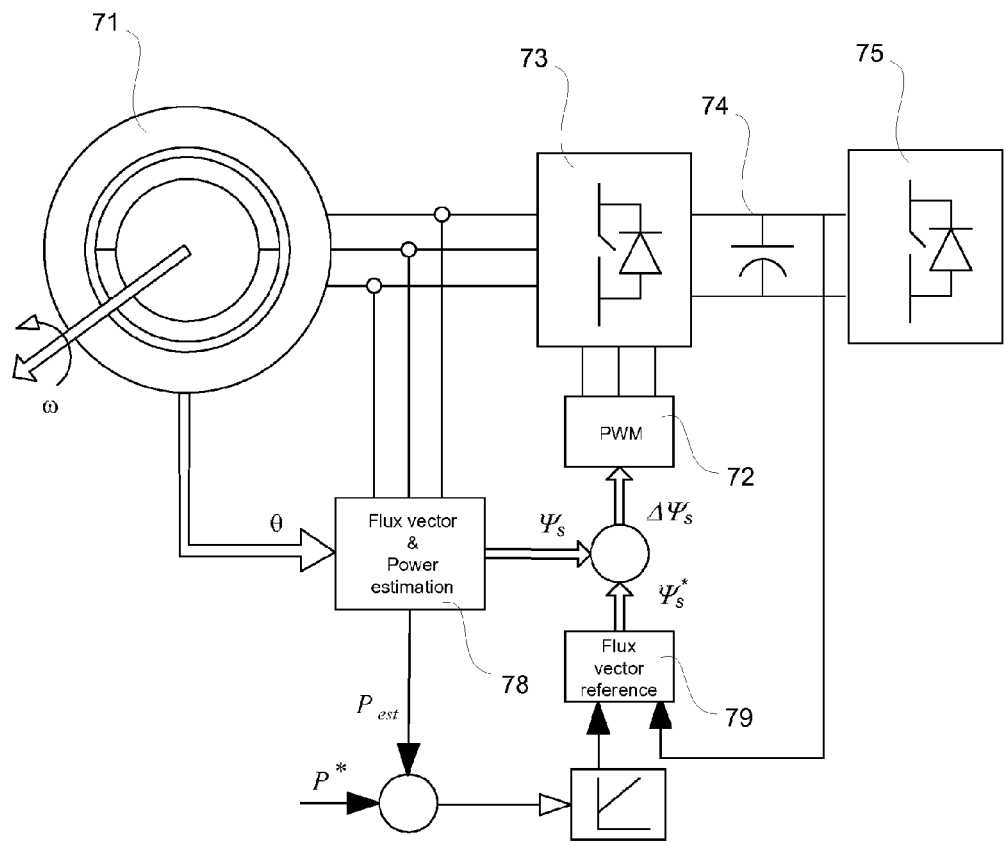
FIG. 6 illustrates a control system for controlling the power of a wind turbine generator according to an embodiment of the present invention.

FIG. 6 illustrates a control system for controlling the power of a wind turbine generator according to an embodiment of the present invention.

The power command to the converter control is compared with the estimated power provided by the generator 71. The mechanical dynamics of the system being slower allows the power controller 79 to be used directly to give the stator flux vector reference.

The generator 71 does not require reactive power unless at very high speeds when field weakening is needed. The EM design caters to this aspect of the generator. Hence it is the active power requirement that drives the power controller at slower generator dynamics. The stator flux vector is still controlled in a similar manner as explained above. The switching carried out using the stator flux vector error is same as has been described earlier.

Figure 7A:
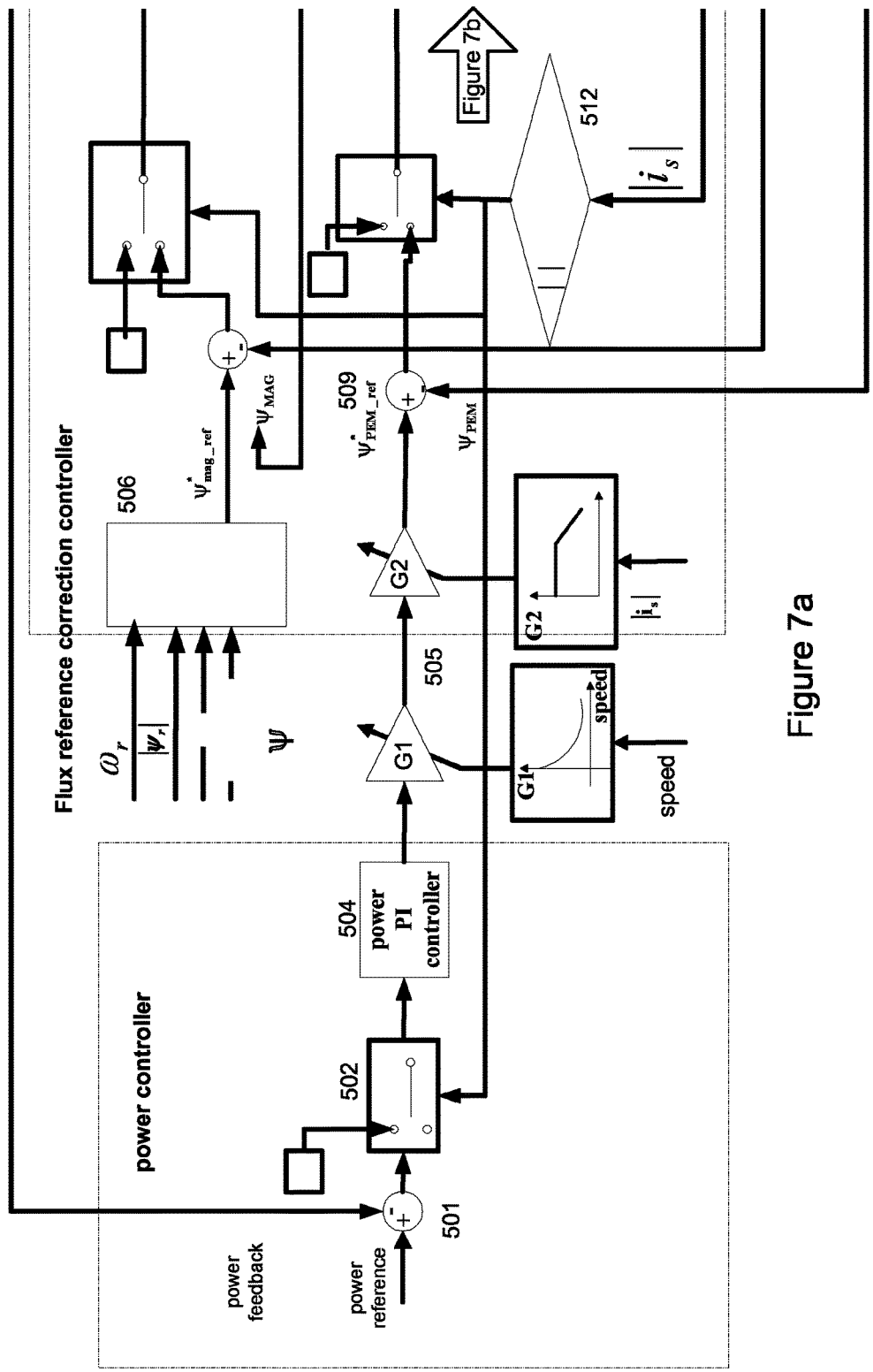
FIGS. 7a-c illustrate a signal flow graph of a generator power and stator flux vector controller according to an embodiment of the invention.
Figure 7B:
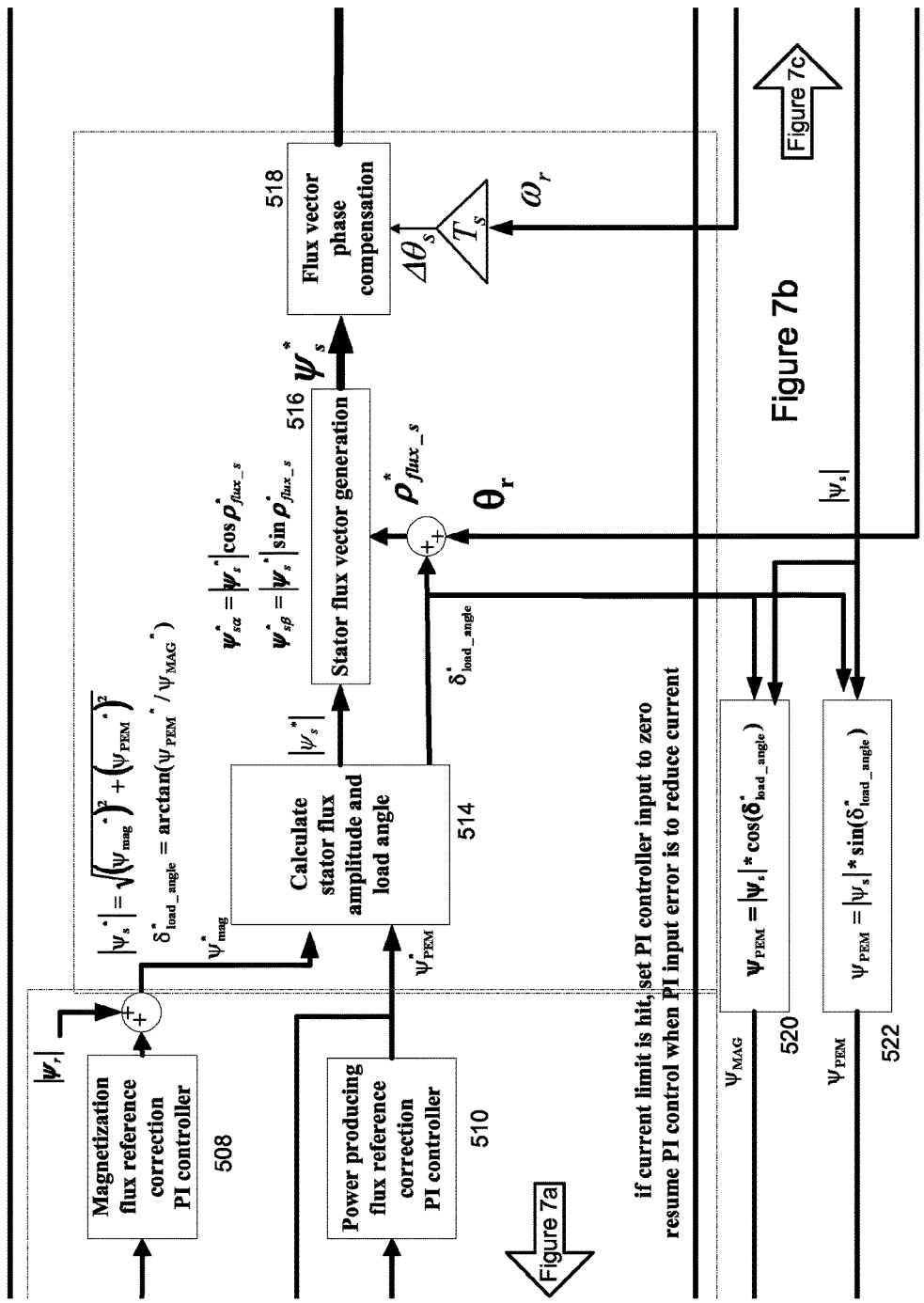
Figure 7C:
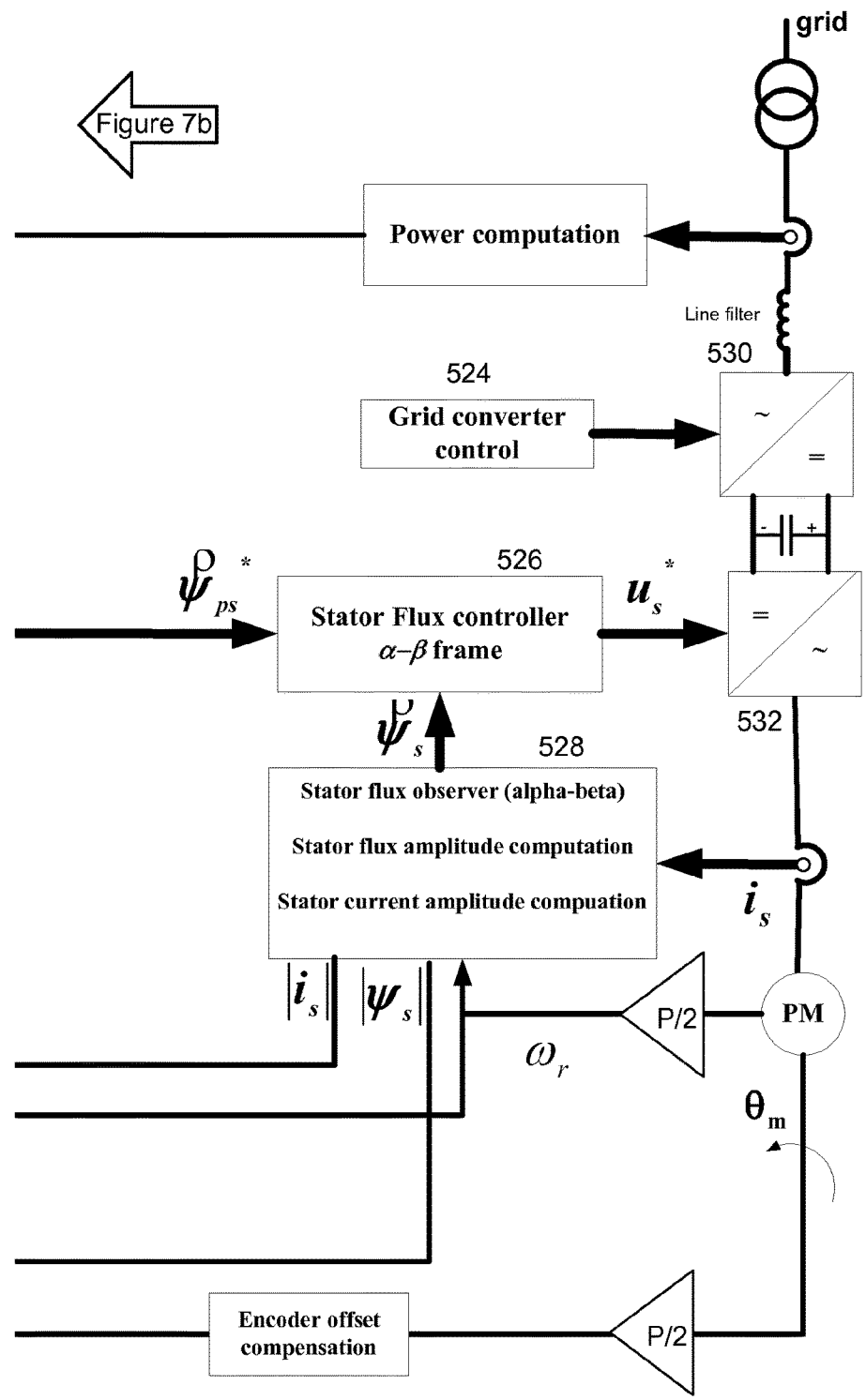

The generator controller will be described with the aid of FIGS. 7a-c.

The basic operation of the controller is as follows: The generator side inverter receives the power command Pref based on either a difference of a desired generator speed and an actual generator speed developed in partial load mode or a constant value based on environmental conditions in the full load mode. The controller operates in a fixed coordinate system of the generator stator.

The controller operates on the basic principle that the electrical power output of a generator is $P_e = \omega^* |\psi_r|^* |\psi_s^*| \sin \gamma$ where:
ω is the rotational speed of the generator;
$|\psi_r|$ is the magnitude of flux provided by the permanent magnet of the rotor
$|\psi_s|$ is the magnitude of the stator flux controlled by the PWM of the generator side inverter
sin γ is the sine of a desired angle γ between flux generated by the permanent magnet of the rotor and stator flux controlled by the PWM of the generator side inverter There are no operations to set either a rotor current component or stator current component in quadrature with a flux vector.

A power command, Pref, from load controllers (not shown) is fed to error detector 501 and compared to the system output power provided to the point of common connection. The output of detector 501 is passed through switch 502 to PI controller 504. Switch 502 is a protective device to remove the Pref command if, during a flux control process, stator currents were to exceed a predetermined value as sensed at block 512.

The output of block 504 is fed through two gain blocks 505 that adjust the power command as a function of generator rotor speed and stator current and converts the power error signal into a required flux ref $\psi_{PEM\_REF}$.

Figure 10:
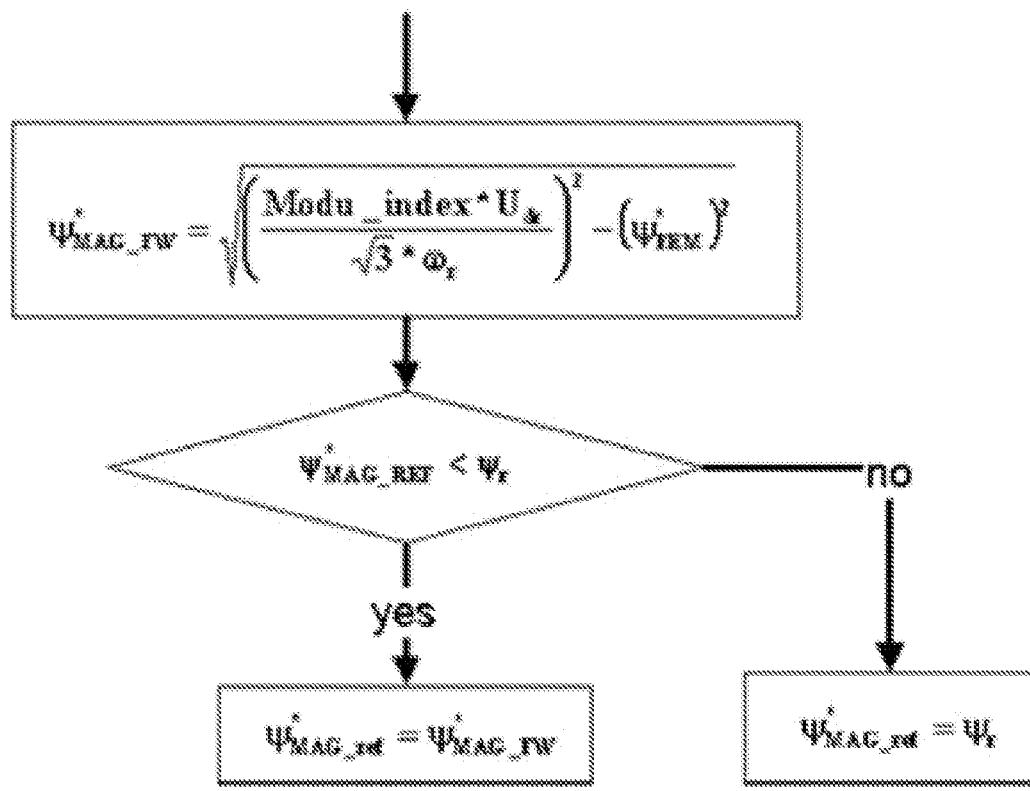
FIG. 10 illustrates a flow diagram of field weakening decission.

$\psi^*_{PEM\_REF}$ is then compared, at block 509, with an output flux value $\psi_{PEM}$, that is proportional to real output power, to form a $\psi_{PEM\_REF\_ERROR}$ which after processing by PI controller 510 becomes $\psi^*_{PEM}$. Likewise $\psi^*_{MAG\_REF}$ (from field weakening block 506) is compared to $\psi_{MAG}$ from block 520 to form a $\psi_{MAG\_ERROR}$ which after processing by PI controller 508 and the addition of $\psi_r$ becomes $\psi^*_{MAG}$. The logic contained in field weakening block 506 is shown in FIG. 10.

The values of $\psi_{PEM}$ and $\psi_{MAG}$ are calculated in blocks 520 and 522 using a total stator flux $\psi_s$ (determined at block 528) using load angle delta (δ), the angle between a desired magnetization flux and desired flux responsible for power production. $\delta^*_{load\_angle}$ is determined at block 514 using the arctan($\psi^*_{PEM}/\psi^*_{MAG}$) while the magnitude of the total stator flux $|\psi^*_s|$ is also determined at block 514 as the square root of the sum of the squares of the flux components into block 514.

Up to this point all signals have been DC values, there have been no transformations into rotating reference systems, nor have there been placement of torque producing current vectors in quadrature with identified rotor flux vectors.

The stator flux vector, having a magnitude and a position, is developed in block 516 and corrected in block 518 for delays caused by the rotational speed of the generator and a need to sample at discrete time intervals. More specifically, and as shown in FIG. 8 the flux reference is adjusted by adjusting the time interval between k's using the delta theta signal fed to block 518.

Field weakening is needed when there is a wind gust and speed of the rotor exceeds the nominal speed. The generated EMF increases leaving small voltage margin to for Generator power and stator flux control. It becomes essential to weaken the resultant air-gap field, so that the effective generated EMF is maintained to a desired value even if there is an increase in speed. FIG. 10 illustrates a flow diagram of field weakening method. The set maximum modulation index is used to compute the resultant magnetizing reference magnitude. Under non-field weakening or low speed conditions, the computed magnetizing reference is greater or equal to the rotor flux magnitude. At high speed, the computation result will be applied. The method also has the possibility to "strengthen" the field in case the magnets are weakened due to high temperatures.

Figure 8:
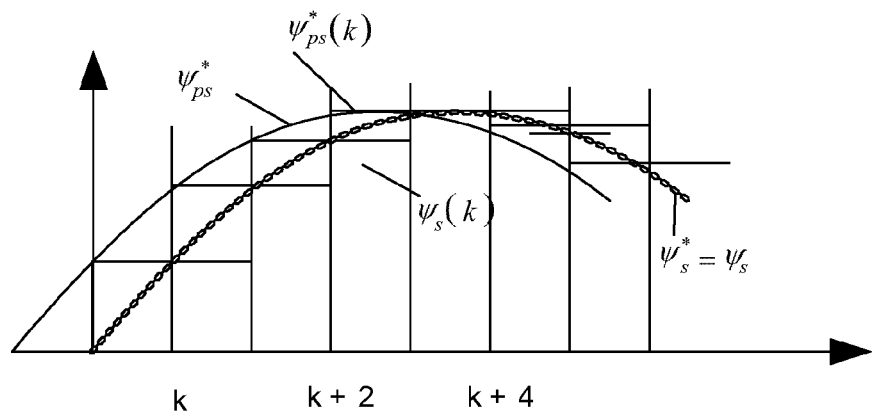
FIG. 8 illustrates a graph for achieving predictive control to mitigate a phase error in the stator flux vector.

Predictive control to mitigate the phase error of the stator flux vector is achieved as shown in FIG. 8. The prediction is carried out in polar co-ordinates and generates the stator flux vector $\psi_{ps}^*$. The estimated stator flux vector $\psi_s$, as shown is compared with the predicted reference stator flux vector and the error vector $\Delta\psi_s$ defines the switching states for control of active power and stator flux vector in the stationary frame of reference.

Figure 9:
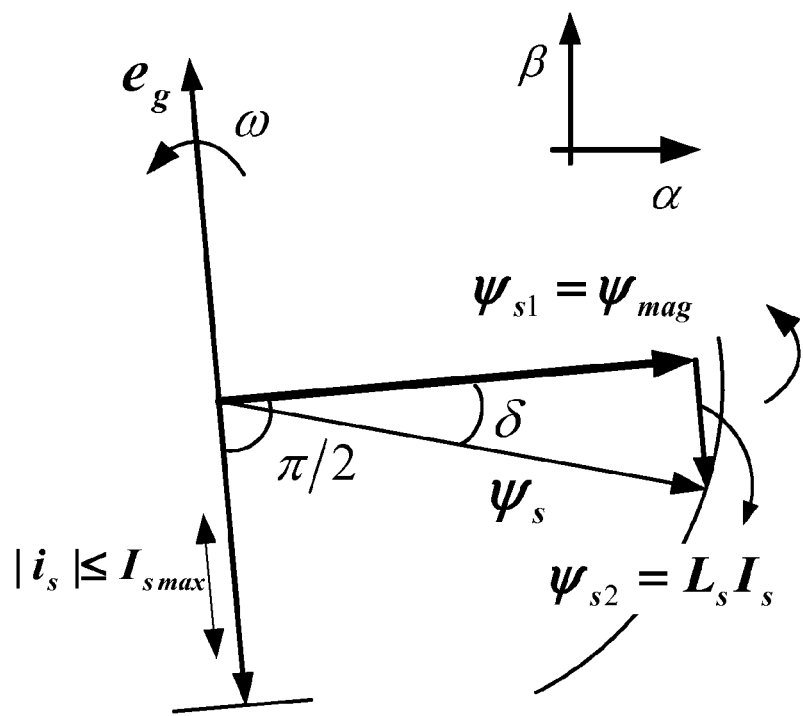
FIG. 9 illustrates a principle of current limiting in reference stator flux vector generation.

Principle of current limiting reference stator flux vector generation is shown in FIG. 9 The fact that no magnetization is needed for a rotor magnetized machine like surface mounted PM machine or a rotor fed synchronous machine, can be exploited to define the desired reference flux vector magnitude. FIG. 9 illustrates this. The current vector needed in such control is just to cater to the active power demand and not to set up any flux in the machine. Hence, the minimum current vector magnitude that can achieve this requirement should lie along a direction perpendicular to the rotor flux vector.

If the machine has to be used as motor, the current vector should lead the rotor flux vector otherwise it should lag the rotor flux vector as shown in the figure. Hence, the component of the reference flux vector that contributes to the torque or active power can be derived directly with the information of this current vector location. This involves the input of the rotor flux vector location, which is available from the position and/or incremental encoder attached to the shaft of the machine. For generators with saliencies in the rotor structure, sensorless operation can be incorporated by measuring the voltage and currents thereby removing the need for a speed/position sensor. The advantage is the possibility for the controller to limit the current in the stationary reference frame. At very high operational speeds, it is possible to have a de-magnetizing component of the stator flux vector. Such component may also be needed when an interior PM machine is employed for power generation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for controlling a variable speed wind turbine generator connected to a power converter comprising switches, said generator comprising a stator and a set of terminals connected to said stator and to said switches, said method comprising:
   determining an estimated stator flux value corresponding to an actual generator power;
   calculating a stator flux difference value between a stator flux reference value and the estimated stator flux value;
   calculating a stator flux difference vector with a magnitude and direction, wherein the stator flux difference vector is a difference between a stator flux reference value and an estimated stator flux vector value; and
   operating said switches of said power converter with switching times based at least on the stator flux reference value, the estimated stator flux value, the calculated stator flux difference value, the stator flux difference vector, and a DC-link voltage of the power converter to adapt at least one stator electrical quantity to obtain a desired generator power magnitude, wherein said switches are operated according to a space vector modulation scheme for controlling a switching pattern of said switches, and wherein said switching pattern is formed by applying one or more vectors during one or more switching times, and said switching times for the switching pattern is determined from the magnitude and direction of the stator flux difference vector.

2. The method according to claim 1, wherein said switches are operated according to a pulse width modulation scheme in order to generate a synthesized voltage waveform at the stator terminals.

3. The method according to claim 1, wherein the switches comprise a first and a second set of switches and first set of the switches are operated to an on-state during a first time interval, τa, and the second set of the switches to an on-state during a second time interval, τb.

4. The method according to claim 3, wherein the first and second time intervals are determined according to $$\tau_a = \frac{|\Delta\Psi_s^*(k)|\sin\left(\frac{\pi}{3} - \gamma\right)}{\frac{\pi}{3}\sin\left(\frac{\pi}{3}\right)}$$

$$\tau_b = \frac{|\Delta\Psi_s^*(k)|\sin(\gamma)}{\frac{\pi}{3}\sin\left(\frac{\pi}{3}\right)}.$$

5. An apparatus for controlling a variable speed wind turbine generator connected to a power converter comprising switches, said generator comprising a stator and a set of terminals connected to said stator and to said switches, said apparatus comprising:
  a power controller adapted to:
    determine a stator flux reference value corresponding to a generator power of a desired magnitude;
    calculate a stator flux difference value between the stator flux reference value and an estimated stator flux value; and
    calculate a stator flux difference vector with a magnitude and direction, wherein the stator flux difference vector is a difference between a stator flux reference value and an estimated stator flux vector value; and
  a switch control unit adapted to operate said switches of said power converter with switching times based at least on the determined stator flux reference value, the estimated stator flux value, the calculated stator flux difference value, the stator flux difference vector, and a DC-link voltage of the power converter to adapt at least one stator electrical quantity to obtain a desired generator power magnitude, wherein said switch control unit is adapted to operate the switches according to a space vector modulation scheme for controlling a switching pattern of said switches, and wherein said switch control unit is adapted to determine the switching times for the switching pattern from the magnitude and direction of the stator flux difference vector.

6. The apparatus according to claim 5, wherein said switch control unit is adapted to operate the switches according to a pulse width modulation scheme in order to generate a synthesized voltage waveform at the stator terminals.

7. The apparatus according to claim 5, wherein the switch control unit is adapted to establish a switching pattern by providing control signals which operates a first set of the switches to an on-state during a first time interval, τa, and a second set of the switches to an on-state during a second time interval, τb.

8. The apparatus according to claim 7, wherein the switch control unit is adapted to determine the first and second time intervals according to $$\tau_b = \frac{|\Delta\Psi_s^*(k)|\sin(\gamma)}{\frac{\pi}{3}\sin\left(\frac{\pi}{3}\right)}$$

$$\tau_a = \frac{|\Delta\Psi_s^*(k)|\sin\left(\frac{\pi}{3} - \gamma\right)}{\frac{\pi}{3}\sin\left(\frac{\pi}{3}\right)}.$$

9. The method of claim 3, wherein the first time interval and the second time interval are determined based on the DC-link voltage of the power converter.

10. The apparatus of claim 7, wherein the first time interval and the second time interval are determined based on the DC-link voltage of the power converter.

* * * * *